Oct. 10, 1939.                M. B. FRY                2,175,521

EAVE TROUGH PROTECTOR

Filed June 25, 1938

INVENTOR
Murrel B. Fry
BY
Maréchal + Noe
ATTORNEY

Patented Oct. 10, 1939

2,175,521

UNITED STATES PATENT OFFICE 2,175,521

EAVE TROUGH PROTECTOR

Murrel B. Fry, Dayton, Ohio

Application June 25, 1938, Serial No. 215,735

2 Claims. (Cl. 108—30)

This invention relates to eave trough screens or protectors.

One object of the invention is the provision of an eave trough protector adapted for use with an eave trough having an inwardly projecting part at the outer end of the trough which overlies the outer end of the protector, the sectional form of the screen being so curved that the protector may be readily positioned or applied under the overhanging eave and to afford a high degree of strength so as to be capable of effectively resisting deformation forces.

Another object of the invention is the provision of an eave trough protector adapted for use over an eave trough and embodying an upwardly arched screen terminating in rigidifying longitudinal edge strips, the maximum height of the arch being of such value and positioning with respect to the edge strips as to afford a high degree of resistance to downward deformation by a superimposed load.

Another object of the invention is the provision of an eave trough and trough protector screen cooperating therewith and held under initial tension and of such character that the body portion of the screen may be readily flexed during installation or removal, the screen being so curved as to be readily applied under the overhanging eave and removably held in place and adapted for use under widely varying conditions of the height and other dimensions of the eaves without screws, nails, fastening wires or the like.

Other objects and advantages will be apparent from the following description, the appended claims, and the accompanying drawing, in which:

Figure 1:
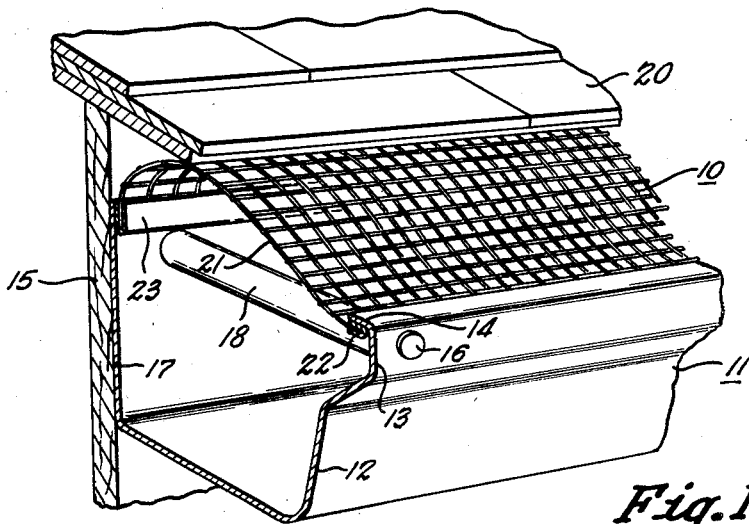
Fig. 1 is a perspective view illustrating a part of an installation in which the protector screen is in place beneath the eave and in the trough.

Screens have been proposed heretofore to prevent leaves and other foreign matter from entering eave troughs, one form of construction being shown in Andrews Patent 1,597,503 on which the present invention is an improvement. In accordance with the present invention, however, the sectional contour of the screen and the relative proportioning of the parts and the manner of installation are such as to permit the screen to be very conveniently and easily installed or removed in existing eave troughs, and to provide a strong construction capable of effectively resisting downward deformation forces on the screen.

As shown more particularly in the drawing, the eave trough protector or screen 10 is shown applied to an eave trough 11 of standard construction. This trough is generally U-shape in cross section and has the upper portion of its outer wall 12 offset as shown at 13 and provided at its upper end with an inturned flange 14. The trough is secured to the supporting wall 15 of a building by means of suitable trough supports or fasteners which, as here shown, comprise nails 16 extending through the outer wall 12 and the inner wall 17 of the trough and into the wall 15, spacing devices such as sleeves 18 maintaining the inner and outer walls of the trough in proper spaced relation one to the other. The trough is arranged below an overhanging eave 20, which may be rather close to the top of the trough.

Figure 2:
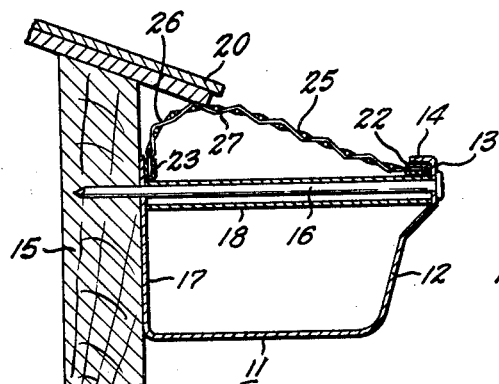
Fig. 2 is a transverse sectional view corresponding to Fig. 1.

The screen is formed of suitable foraminous material, preferably a wire mesh fabric of a semi-rigid character but having some flexibility so that it may be formed or flexed manually. The screen is formed in sections of suitable length, such for example as 8 feet, each section comprising the wire mesh strip 21 having a marginal edge strip 22 rigidifying the outer edge of the screen. This strip 22 is preferably a flattened, substantially U-shaped piece of sheet metal clamped or squeezed over the edge of the screen mesh as indicated in Fig. 2. The opposite side of the screen, as shown, is also provided with a rigidifying sheet metal edge strip 23, these rigidifying strips extending only along the lateral edges. The material of the screen may be galvanized iron or copper or other suitable metal similar to that of the trough with which the screen is to be used.

In position, the trough protector has a cross sectional form providing an outwardly and downwardly sloping outer portion 25 terminating in the outer edge strip 22 which is arranged below the flange 14 of the trough and rests on the upper side of the sleeves 18, the slope of this portion of the screen being adequate for the leaves or other substances washing or moving down along the roof to slide or wash downwardly and over the top of the flange 14. Such leaves as are not washed over rest on the screen may quickly dry out so that they are easily blown away. The inner portion 26 of the screen curves downwardly and inwardly, preferably at a somewhat steeper angle than the slope of the outer portions, and terminates in the edge strip 23 which extends in a plane approximately 90° from the plane of the outer edge strip 22 so that the lower end of the edge strip 23 may rest on the inner ends of the sleeves 18 at a point substantially horizontally displaced from the outer edge strip. Merging gradually with the outer and inner portions 25 and 26 of the screen is an upwardly bowed or arched portion 27 the top of which is at the approximate level of a horizontal plane through the lower edge 28 of the eave. This arched portion 27 has a gradual curvature and in fact the entire surface of the screen is preferably without any abrupt bends or angles so that its upwardly arched formation offers a high degree of strength resistance to downward deformation such as might be produced by a heavy load on top of the exposed screen surface, this loading being sometimes quite large as in case of heavy wet snows for example.

As will be noted from Fig. 2, the maximum height of the screen when in place is of the order of one fourth of the distance between the edge strips although this proportioning will of course vary for different installation conditions because of different distances between the lower end of the eave and the top or mouth of the trough, and because of different distances of projection of the eave from the building wall. However the top arched portion of the screen at least at some points along its length is adapted to bear against the lower end of the eave, although in view of the slope of the trough, provided for drainage purposes, the screen over the lowermost portions of the trough may be some little distance below the lower end of the eave. However the present invention provides a substantial degree of flexibility such that the protector screen accommodates itself to the particular installation notwithstanding considerable variation in the height of the eave over the trough, the spacing of the trough from the wall of the building and the like. This is accomplished by reason of the structure of screen above described, having such flexibility that it can adjust itself to the proper protecting relation when inserted in place as will be described below.

Figure 3:
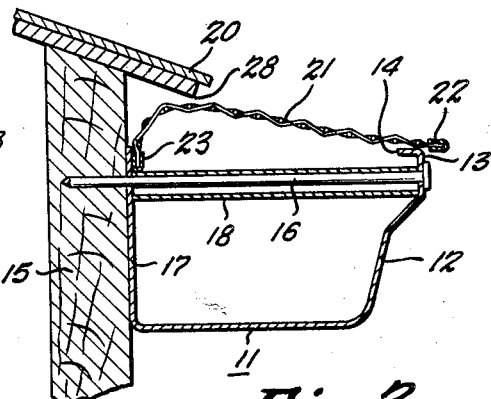
Fig. 3 is a transverse sectional view showing the screen inserted beneath the eave and ready to be sprung into the trough.
Figure 4:
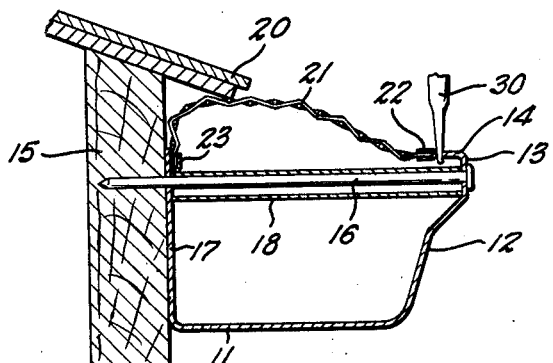
Fig. 4 is a sectional view showing the screen deformed and pressed inwardly by an installing tool.

The distance between the outer and inner edge strips 22 and 23 before installing the screen is somewhat greater than the distance between these edge strips when in installed position so that the outer edge strip 22 presses outwardly against the outer wall of the trough, and the inner edge strip presses yieldingly against the inner wall of the trough, maintaining a tension in the upper portion of the screen and bowing this upper portion upwardly further than the bow of the original screen. As formed ready for installation, the distance between the inner and outer edge strips exceeds the installed distance or the distance across the trough by an amount approximately corresponding to the breadth of the edge strip 22, or more or less than this according to different conditions of installation, and the total height of the screen is about the same or slightly less than the distance between the lower end of the eave and the top of the sleeves 18 so that the inner portion of the screen may be very conveniently inserted without deformation below the overhanging eave and into the position indicated in Fig. 3. This is of particular value where, as often occurs, the lowermost portion of the eave extends relatively quite close to the top of the trough. In this position, as will be apparent from the drawing, the top of the screen is arranged somewhat outwardly beyond the inner edge strip 23 and the outer edge strip 22 overhangs and is above the flange 14. The outer edge strip is then pushed towards the wall 15 and may be readily applied over the flange 14 by a flat tool such as a putty knife 30 or other suitable tool to bring the outer edge strip 22 into the position indicated in Fig. 4 by deforming the screen as may be required. In view of the substantially rigid character of the edge strip 22 comparatively long lengths of the strip may be applied by a localized wedging force in one or two places. The outer edge strip 22 then readily slides under the flange, the natural resiliency of the wires springing the edge strip into position and forcing the edge strip outwardly to its installed position indicated in Fig. 2 which, as previously stated, leaves the screen tensioned in position and with a tensioned upward arch capable of resisting very substantial deformation loads applied to the top of the exposed surface of the screen. Where the eave extends closely over the trough, the forcing of the outer portion of the screen into installed position causes the arched portion thereof to press against the eave, the screen bowing up in front of the arch to the extent necessary to accommodate itself to the height of the eave at that particular point. The screen is thus automatically adaptable to a substantial variation in conditions of installation, forming an effective protection and a strong construction at all times. It is unnecessary to use any screws, bolts or fastening wires to hold this screen in position where the outer edge strip is snapped under the retaining flange of a trough of this kind. Moreover the screen may be readily removed if occasion should require by prying the outer edge strip 22 towards the inner edge strip and out of position beneath the flange 14 and then bringing it over the top of the flange and back to the position shown in Fig. 3 whereupon the screen may be merely pulled outwardly and removed.

As will be understood, the troughs may be of different widths and the distances between the bottom of the eave and the top or mouth of the trough in different installations may vary somewhat but a few standard screen widths have been found to take care of practically all varying conditions and to effectively close the top of the trough and prevent collection of leaves and debris within the trough as well as the building of bird's nests therein. At the end of the trough the space between the top of the end wall of the trough and the top of the screen may be closed by having the middle portion of the screen project beyond the trough end some little distance and then bent downwardly into contact with the end wall from one side of the trough to the other, the rigidifying end strip 22 and 23 being cut off even with the end of the trough so as to terminate just inside the trough end.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. The combination of an eave trough having an inwardly projecting top flange on the outer part thereof, an eave spaced above and overhanging the inner part of the trough, trough supports extending across the trough below said flange, and a protector screen having a rigidifying outer edge extending below said flange and resting on said supports, said screen having an outer portion which inclines outwardly and downwardly at a small angle to said outer edge, an inner portion beneath the eave inclining inwardly and downwardly at a steeper angle than said outer portion, and an upwardly arched top portion merging smoothly with said outer and inner portions of the screen and located some substantial distance outwardly of a vertical plane through the inner terminal edge of the screen and at the approximate level of the horizontal plane through the lower edge of the eave, the screen having an initial tension when in position tending to increase the distance between the outer edge and the inner edge of the screen.

2. An eave trough protector adapted for use with an eave trough having an inwardly projecting top flange comprising a strip of wire screen having a reinforcing longitudinally extending terminal edge of substantial rigidity adapted for retention under the trough flange and an inner reinforcing longitudinally extending terminal edge, the major portion of the screen inclining downwardly towards said outer edge at a small angle to the horizontal, the inner portion of the screen being downturned and inclining downwardly and inwardly to its inner terminal edge at a greater angle to the horizontal than the major portion, the top part of the screen being arched upwardly and merging gradually into the inner and outer portions and arranged some substantial distance outwardly of a vertical plane through the rear terminal edge and having sufficient flexibility to be readily flexed manually during mounting and removal to change the distance between the terminal edges, the distance between the inner and outer ends of the screen being normally considerably in excess of the distance across the trough with which the screen is used.

MURREL B. FRY.